Aug. 1, 1950       M. F. ROYSTON       2,516,919
ELECTRODYNAMIC PHONOGRAPH PICKUP
Filed June 5, 1946
Fig. 1
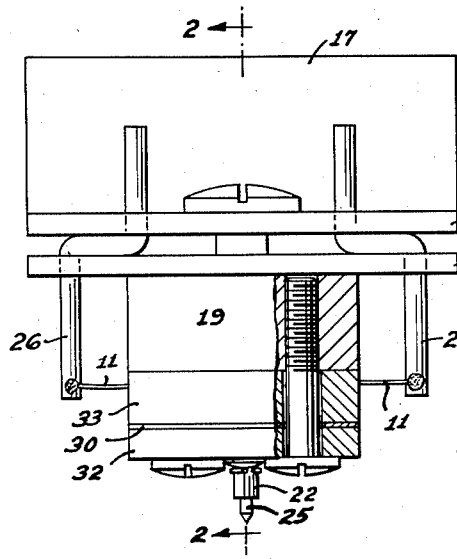
Fig. 2
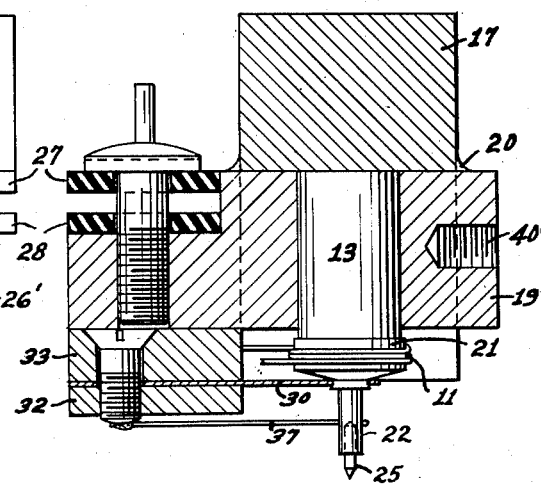
Fig. 4
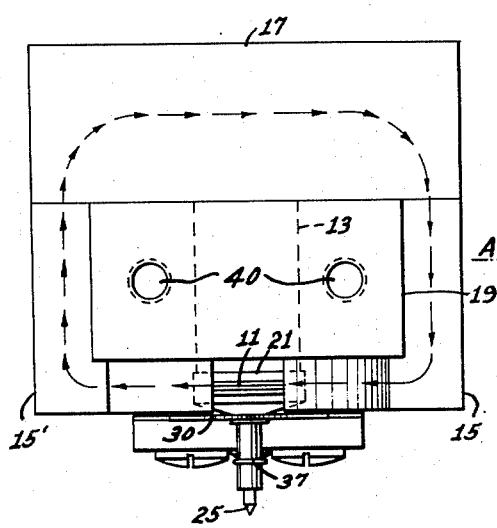
Fig. 3
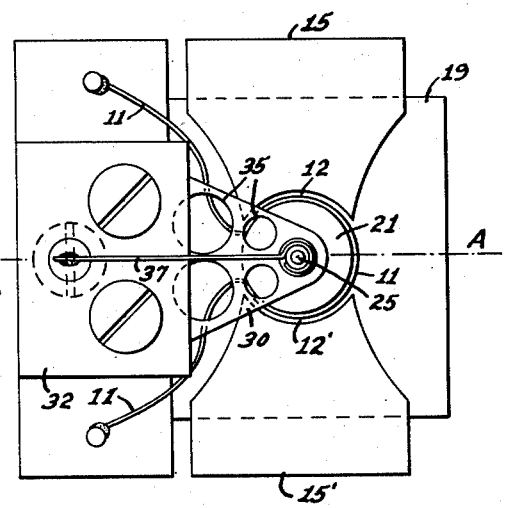
Fig. 5
COIL SUPPORT
APPROX. FULL SIZE
INVENTOR
Marvin F. Royston
BY
Pennie, Edmonds, Morton and Barrows
ATTORNEYS Patented Aug. 1, 1950

2,516,919

UNITED STATES PATENT OFFICE 2,516,919

ELECTRODYNAMIC PHONOGRAPH PICKUP

Marvin F. Royston, Poughkeepsie, N. Y., assignor to ATF Incorporated, a corporation of New Jersey Application June 5, 1946, Serial No. 674,456

2 Claims. (Cl. 179—100.41)

This invention relates to electromagnetic reproducers for use in connection with mechanically produced sound tracks of the laterally-cut variety, such as may be employed in conventional phonograph records, mechanical recordings on film, etc.

It is an object of the invention to provide a reproducer which will faithfully translate lateral variations of a sound track, throughout a wide frequency range, into a varying electric potential.

Another object is to provide a reproducer which has a moving system of extremely low mass and which requires only a very light pressure to be exerted on the record by the reproducing stylus, whereby wear of the record and of the stylus is minimized.

Another object is to provide a moving system for a reproducer which has a low moment of inertia about the principal axis of vibration thereof, whereby wear is also reduced and an improved response characteristic secured.

A further object is to provide a reproducer having the above characteristics which is simple in design and economical to manufacture.

The advantageous features of the invention, particularly fidelity of response and low record wear, result chiefly from the low moving mass and moment of inertia of the reproducer and the type of suspension employed for the pick-up coil, including the relations between the several compliances of this suspension.

The invention will be better understood from consideration of the following specification, with reference to the appended drawing in which:

Fig. 1 is an enlarged and elevational view, partly in section, of a reproducer in accordance with the invention;

Fig. 2 is an elevation in section along the line 2—2 of Fig. 1;

Fig. 3 is a bottom plan view; and

Fig. 4 is an end elevational view, opposite that of Fig. 1, to the same scale as said figure;

Fig. 5 is an elevation of the coil support of the reproducer, shown approximately full size.

In the figures, all of which, except Fig. 5, are greatly enlarged for clearness of illustration, numeral 11 is applied to a pick-up coil having portions thereof on opposite sides of center line A—A positioned in similar annular air gaps 12, 12' symmetrical about center line A—A and bounded by central cylindrical core 13 and the tips of pole pieces 15, 15', respectively. Both core and pole pieces are of soft iron or other highly permeable material. A strong magnetic field is created in gaps 12, 12' by a permanent magnet 17 of high coercive force material, such as "Alnico V," which sends flux through a magnetic circuit indicated by the arrows of Fig. 4.

This circuit may be traced from the right-hand end of magnet 17 (as seen in the figure) through pole piece 15, air gap 12, core 13, air gap 12' and pole piece 15' to the left-hand end of magnet 17. It will be noted that the magnetic field has the same direction in air gaps 12 and 12'.

Core 13 is pressed into a non-magnetic support member 19, for example of brass, which is assembled with pole pieces 15, 15' and which extends therebeyond in the direction of center line A—A for attachment and support purposes, to be referred to hereinafter. Due to the shape of the several members and the pull of magnet 17 on the pole pieces, the assembly of magnet core and pole pieces tends to be firmly held together. However, cemented connections as at 20 between magnet 17 and member 19 may be used.

Coil 11 in a typical embodiment of the invention may consist of approximately 30 turns of Number 44 B. and S. gauge enameled wire supported in insulated relation on a cup-shaped member 21 of non-magnetic material, preferably aluminum, adapted to fit in spaced relation over the end of core 13 and having a cylindrical extension 22 thereof extending along the axis of the coil, for mounting a conventional reproducing stylus 25 of sapphire or other wear-resistant material. The approximate actual size of coil support 21 is shown in Fig. 5, from which an idea of the size of the whole reproducer assembly may be gained.

A resilient suspension for coil support 21 is provided by a pair of substantially parallel springs spaced in the direction of the coil axis and respectively engaging extension 22 of the coil support at axially spaced locations. The upper of the two springs 30 is a leaf cantilever spring, of triangular shape in its free portion, and is held at one end thereof between a clamping plate 32 and a spacer 33, the assembly being mounted on the lower surface of one of the lateral extensions of support member 19. Spring 30, in a typical example, may be of spring steel having a thickness of approximately .003 inch. Near its outer end spring 30 fits over a short collar formed on coil support extension 22 and may be fixedly attached thereto by a swaging or spinning operation. The free portion of spring 30 has a number of holes 35 formed therein both to lighten the moving system of the reproducer and to adjust the compliances thereof.

The lower of the two spaced springs 37 is constituted by a piece of music wire of the order of .004 inch in diameter which has one end thereof soldered to a screw 38 projecting from clamping plate 32 and the other end formed into a loop closely encircling extension 22 of the coil support.

It will be apparent that leaf spring 30 has relatively low compliance for displacements along its principal axis, substantially parallel to and coincident in plan view with center line A—A, and at right angles thereto in the plane of the spring, but has a relatively high compliance for vertical displacements, that is for displacements along the axis of coil 11, and also for torsional displacements about the principal axis of the spring. Music wire spring 37 serves principally to hold the axis of the coil and its support vertical and has relatively high compliance for all linear and torsional displacements except along the axis of the wire, which also is substantially parallel to and coincident in plan view with center line A—A. The torsional compliance is preferably higher than that of spring 30.

In operation the reproducer is aligned with the record so that center line A—A is substantially parallel to the sound track. Under this condition, as the record is advanced, the lateral variation in the sound track, which constitutes the recorded sound and may be of the order of plus or minus .003 inch, vibrates stylus 25 laterally relative to center line A—A and due to the relatively high compliances of wire 37 and the relatively lower torsional compliance of spring 30, coil support 21 chiefly twists about the principal axis of spring 30. As above noted, the torsional compliance which this spring presents may be adjusted by the size and location of holes 35 therein. Twisting of the coil support about the axis of spring 30 rocks coil 11 about the same axis, which is in a plane not far removed from the diametral axes of the coil, so that the portions of coil 11, respectively positioned in gaps 12, 12', cut the magnetic fields therein in opposite directions, one coil portion moving up, while the other moves down and vice versa. The voltages generated in the two coils portions by this motion are, therefore, in aiding relation and result in a net external voltage whereas any irregularity of the depth of the sound track which moves the two coil portions in the same direction relative to the flux is ineffective to generate at net voltage.

It is to be noted that the stylus 25 is positioned directly on the coil axis. The coil support therefore need only comprise sufficient material to connect the coil and stylus in the most direct manner. Also, since the coil support rocks about a transverse axis intersecting the coil axis, the moment of inertia of the moving system about this axis, for a particular mass, may be held to a minimum. This low movement of inertia tends to improve the frequency response of the reproducer and to reduce wear of the lateral walls of the sound groove. The above-described arrangements for rocking the coil in the magnetic field about an axis intersecting the coil axis are in contrast to prior arrangements for playing laterally-cut records, for example those of the dual-coil, dual-purpose reproducer disclosed in U. S. Patent 2,027,168, wherein the axis of torsional vibration is offset from each coil axis and therefore each coil and support has a materially higher moment of inertia about its vibrational axis, for the same mass, than in the arrangements of the present invention. An offset axis such as is shown in said patent moreover requires more material to effect a suitable structural connection between the stylus and coil than is required when the stylus is on the coil axis, thereby further tending to increase the moment of inertia of the moving system.

The low weight of the reproducer of the invention and the low stylus pressure required tend to reduce vertical wear of the sound groove, as well as lateral wear. To gain an idea of the order of magnitude of the weight involved, a typical assembly, such as is illustrated in the figures, has been built to weight approximately 10 grams. With such a reproducer the pressure on the stylus may be of the order of 4 grams. These values are considerably lower than those achieved with earlier reproducer designs.

Coil 11 may be connected to an external circuit by way of bent terminal pins 26, 26' clamped between insulating strips 27 and 28. The reproducer may be held in a housing or attached to other supporting means by screws in engagement with tapped holes 40 in support member 19.

The embodiment of the invention described herein is to be understood to be by way of illustration, only, and not by way of limitation, the scope of the invention being defined in the appended claims.

I claim:

1. In an electromagnetic reproducer for laterally-cut sound records, a supporting block of non-magnetic material, a permanent bar magnet horizontally disposed on and in contact with the top surface of the supporting block with the ends thereof projecting laterally outwardly, a pair of magnetically permeable pole pieces extending downwardly from respective ends of the magnet in contact with the vertical lateral sides of the supporting block, said pole pieces having integral pole tips extending inwardly in contact with the bottom surface of said block, a central cylindrical magnetically permeable core secured vertically in said block with the lower end extending symmetrically between said pole tips to provide a pair of similar annular gaps oppositely located about an axis of symmetry, the flux excited by said magnet flowing in the same direction across both gaps, a single cylindrical pick-up coil positioned within said gaps coaxial with said core, a support for said coil symmetrical about the coil axis, a reproducing stylus mounted by said support on the coil axis remote from said coil, and a resilient suspension for said support comprising a pair of cantilever springs affixed to said supporting block having their respective principal axes aligned with said core diameter and intersecting the coil axis, said springs at the respective free ends thereof engaging said coil support at spaced locations along the coil axis intermediate said coil and stylus, both the torsional compliance and the linear compliance in a direction normal to said core diameter being lower for said spring adjacent said coil than for said other spring, whereby vibration of said stylus laterally of said core diameter is caused to produce torsional vibration of said coil about the principal axis of said spring of lower torsional compliance to generate a voltage in the coil, said coil and support having a relatively low moment of inertia about said vibrational axis thereof due to the relation of said vibrational axis to said coil axis.

2. In an electromagnetic reproducer for laterally-cut sound records, a supporting block of non-magnetic material, a permanent bar magnet horizontally disposed on and in contact with the top surface of the supporting block with the ends thereof projecting laterally outwardly, a pair of magnetically permeable pole pieces extending downwardly from respective ends of the magnet in contact with the vertical lateral sides of the supporting block, said pole pieces having integral pole tips extending inwardly in contact with the bottom surface of said block, a central cylindrical magnetically permeable core secured vertically in said block with the lower end extending symmetrically between said pole tips to provide a pair of similar annular gaps oppositely located about an axis of symmetry, the upper end of said core being in contact with said magnet and the flux excited by said magnet flowing in the same direction across both gaps, a cylindrical coil support having a cup-shaped portion thereof positioned within said gaps and another portion thereof extending therefrom along the axis of said core, a reproducing stylus carried on the axis of said core by said support extension at the end thereof, a single cylindrical pick-up coil carried by said cup-shaped support portion coaxial with and within said gaps, a leaf cantilever spring affixed at one end thereof to said supporting block and attached at the free end thereof to said support extension adjacent said coil, said spring having the principal axis thereof substantially parallel to said axis of symmetry and intersecting the axis of said coil, and a second cantilever spring spaced from said leaf spring constituted by a wire affixed at one end thereof to said block and attached at the free end thereof to said coil support, said wire having the longitudinal axis thereof substantially parallel to said axis of symmetry and intersecting said coil axis, whereby vibration of said stylus laterally of said coil diameter produces torsional vibration of said coil about the principal axis of said leaf spring to generate a voltage in said coil.

MARVIN F. ROYSTON.

REFERENCES CITED

The following references are of record in the file of this patent:

UNITED STATES PATENTS

| Number | Name | Date |
| --- | --- | --- |
| 2,027,169 | Harrison | Jan. 7, 1936 |
| 2,031,948 | Harrison | Feb. 25, 1936 |
| 2,034,872 | Keller | Mar. 24, 1936 |
| 2,055,187 | Vieth | Sept. 22, 1936 |
| 2,133,815 | Harrison | Oct. 18, 1938 |
| 2,347,347 | Yenzer | Apr. 25, 1944 |
| 2,406,597 | Fauss | Aug. 27, 1946 |